QUANTIZING CIRCUIT USING PROGRESSIVELY
BIASED TRANSISTORS IN PARALLEL
Original Filed May 21, 1962

INVENTOR.
Fred B. Maynard
BY
Mueller & Aichele
Attys.

United States Patent Office 3,458,721

Patented July 29, 1969

3,458,721 QUANTIZING CIRCUIT USING PROGRESSIVELY BIASED TRANSISTORS IN PARALLEL

Fred B. Maynard, Phoenix, Ariz., assignor to Motorola, Inc., Franklin Park, Ill., a corporation of Illinois Continuation of application Ser. No. 196,140, May 21, 1962. This application May 28, 1965, Ser. No. 459,547

Int. Cl. H03k 5/20

U.S. Cl. 307—235 9 Claims

ABSTRACT OF THE DISCLOSURE

Disclosed is a signal conversion circuit for converting an analog voltage to digital pulses. The circuit includes a plurality of transistors connected in parallel between a common input circuit impedance and a common output impedance, and the emitter and collector electrodes of the transistors are connected via variable tap means to selected D.C. operating voltages. By adjusting the variable tap means, the operating voltages for the individual transistors may be set at preselected levels so that as the analog input signal rises, successive ones of the transistors are biased into conduction. As each transistor conducts, an output pulse provided thereby is capacitively coupled to the output impedance, and the number of output pulses coupled to the output impedance is representative of the level of the applied analog input signal.

This is a continuation of the application Ser. No. 196,140, filed May 21, 1962, now abandoned.

This invention relates to a signal conversion circuit and more particularly to a transistorized circuit for converting an analog voltage to digital pulses.

There are many present-day applications where it is desirable to convert a varying voltage signal which may be characterized as an analog signal to a series of pulses, with the number of pulses representative of the level of the analog signal. Circuits performing this function are commonly referred to as digitizers or quantizers and provide a digital code that may conveniently be applied to memory storage and logic systems for further processing. For example, electrical parameters of electronic equipments or individual devices which are usually obtained in the form of a varying level test voltage may be digitized and stored so that a plurality of variables can be assimilated to provide overall test results. The digital signal may represent the magnitude of the analog test voltage or it may indicate the predetermined range into which the analog voltage falls.

Generally, known digitizers or quantizers utilize electromechanical devices such as stepping switches or servomechanisms, or require the use of electronic counters in conjunction with gating circuits. In the latter arrangement, it is usually necessary to compare the analog voltage with discrete reference voltage levels to allow clock pulses through a gate in response to a null detecting circuit. Such systems require stable null detection circuits and accurate synchronization with the clock pulses and are limited in operating speeds to the time required to count the clock pulses. In addition, it is necessary to provide accurately spaced clock pulses to insure reliability of operation.

It is therefore an object of the present invention to provide an analog-to-digital converter employing simple circuitry to insure rapid and reliable signal conversion.

A further object is to provide a digitizer in which the digital output pulses are self-generating in response to an analog input voltage, thereby eliminating the need for null detection and the use of clock pulses.

Another object is to provide a simple quantizer circuit capable of producing a digital output in response to a predetermined range of input voltage levels, which output may be conveniently coupled to a data processing system as a binary representation of a given input voltage range.

A feature of the present invention is the provision of a plurality of transistors arranged to be individually biased in a non-conducting state, with the input electrode of each transistor connected to a common input terminal. An analog signal coupled to the common input causes the transistors to conduct in sequence as the level of the input voltage rises to a value which overcomes the biasing voltage of individual transistors to thereby produce a series of output pulses.

Another feature is the provision of at least two transistor stages having a common input and a series biasing arrangement such that individual ones of the transistors conduct only in sequence and such that an output signal cannot be produced by the next higher biased stage until the previous transistor in the series biasing arrangement is rendered conducting. The output pulses thereby produced are indicative of the voltage range of the input signal necessary to render two successive transistors conductive.

A further feature of the present invention is the provision of a plurality of direct current transistor amplifiers arranged to be biased to cutoff by a series voltage arrangement so that a varying direct current voltage applied to a common input terminal causes individual ones of the transistors to conduct when its bias has been overcome, but will not render successively higher biased transistors conductive until the previous transistor conducts. A series of output pulses produced in response to conduction of individual transistors is indicative of the level of the direct current input voltage.

The analog-to-digital converter of the present invention includes a plurality of transistor stages each having individual load resistors, with each stage biased to cutoff from a common source. The biasing is arranged so that successively higher input signal levels must be applied to the input electrode of individual ones of the transistors to switch it to a state of conduction. When the input electrodes of the transistors are connected to a common input terminal, the number of transistors rendered conductive is dependent on the level of the input analog voltage. As each transistor is rendered conductive, an output voltage is developed across its load resistor which is different for each transistor with respect to a common reference potential so that a step output is produced when referred to a common reference. The output electrode of each transistor is further coupled by a capacitor and an output impedance to the common reference potential so that the charge maintained on the capacitor is indicative of the output voltage of that transistor. Upon conduction of each transistor, its associated capacitor momentarily discharges as a voltage is developed across its load resistor to produce a pulse across the output impedance. Accordingly, there is a pulse produced for each voltage step as successive transistors are switched to conduction by the input signal and the total number of pulses is indicative of the level of the analog input signal. Further, since successive pulses cannot be produced until the lower transistor on the biasing arrangement is rendered conductive, the presence or absence of two successive pulses may be used as a binary representation of a range of input analog voltage levels.

Figure 1:
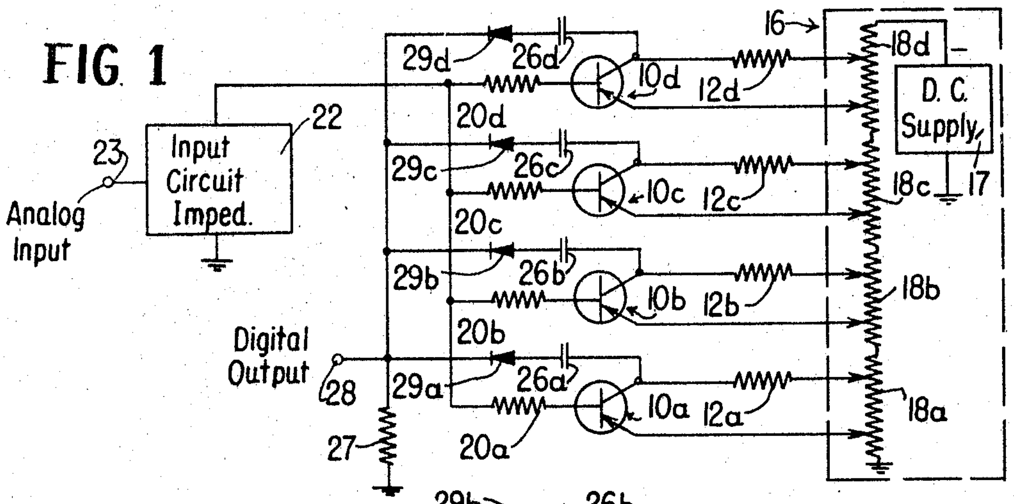
FIG. 1 is a schematic diagram of the analog-to-digital converter of the present invention.

Referring now to FIG. 1, each of transistors 10*a*–10*d* are connected as a simple amplifier stage. Load resistors 12–12*d* are provided with one end thereof connected to the collector electrode of each transistor and with the other end thereof connected to voltage source 16. The emitter electrodes of transistors 10*a*–10*d* are also each individually connected to voltage source 16. As shown, voltage supply 16 may include a series of resistors 18*a*, 18*b*, 18*c* and 18*d* connected as voltage dividers between the output of DC supply 17 and ground reference potential. Preferably DC supply 17 is well regulated and the voltage divider arrangement draws sufficient leakage current that individual transistor conduction currents do not change the voltage developed across tap points of the divider. Alternately, voltage supply 16 may include a series of voltage cells connected in series in a stacked arrangement, with each transistor and its associated load resistor connected across individual ones of the voltage cells. It is to be noted that this voltage arrangement provides a collector-to-emitter operating voltage and an emitter to ground biasing voltage for each individual transistor, with the biasing voltage selected to maintain each transistor in a cutoff state in the absence of a signal applied to its base electrode. The operating voltages for the transistors may all be the same or may individually be selected to be of different values. The manner in which the biasing voltage for each transistor is tapped off in the stacked voltage arrangement of voltage supply 16 is such that the emitter voltage of each transistor, when referred to a common reference or ground potential, is successively higher than the same voltage of the lower transistor connected to voltage arrangement.

The base electrodes of each of transistors 10*a* through 10*d* are connected to one end of resistors 20*a*, 20*b*, 20*c* and 20*d*, respectively. The other end of each of these resistors is commonly connected through input impedance circuit 22 to analog input terminal 23. In its simplest form, input circuit impedance 22 may consist of a resistor connecting the common side of base resistors 20*a* through 20*d* to ground reference potential. With no voltage applied to analog input 23, this maintains the base electrode of all of the transistors at ground potential, and accordingly, the emitter electrodes of transistors 10*a* through 10*d* are at or below the voltage supplied to their base electrodes to maintain them in cutoff condition.

Capacitors 26*a*, 26*b*, 26*c* and 26*d* couple the collector electrode of each transistor to one side of common output resistor 27. The other side of resistor 27 is connected to ground and an output signal is derived across resistor 27 at terminal 28. If desired, isolation diodes 29*a*, 29*b*, 29*c* and 29*d* may be series connected between each of capacitors 26*a* through 26*d* and the common point of resistor 27. These diodes are poled to allow discharge current to flow from the capacitors to ground reference potential whenever individual ones of transistors 10*a* through 10*d* are rendered conductive.

Figure 2:
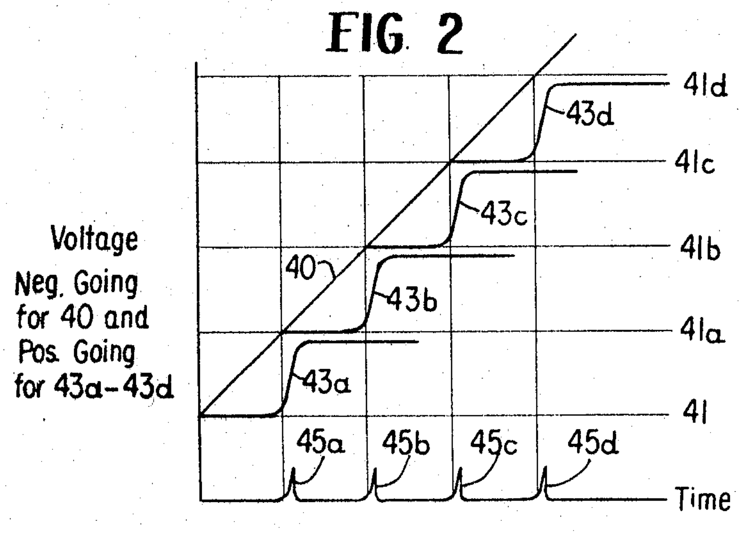
FIG. 2 represents waveforms which are useful in understanding the operation of the circuit of FIG. 1.

A negative going analog voltage supplied to input terminal 23 overcomes the base-to-emitter biasing voltage for individual ones of transistors 10*a* through 10*d* to render them conductive. With reference to waveforms of FIG. 2, as analog voltage 40 rises from reference level 41 to level 41*a*, transistor 10*a* is rendered fully conductive. This produces a step voltage 43*a*, positive going at the collector of transistor 10*a*, across load resistor 12*a*. There is a momentary discharge of capacitor 26*a* to produce pulse 45*a* across resistor 27. It is to be noted that at this point in time analog input 40 has not risen to a level sufficient to overcome the emitter bias on transistor 10*b* with respect to ground reference potential. Thus, transistor 10*b* remains cutoff. As analog voltage 40 rises from level 41*a* to 41*b*, transistor 10*b* becomes conductive to produce output step voltage 43*b* and pulse 45*b* across resistor 27. The magnitudes of step voltages 43*a*–43*d* are equal to the collector-to-emitter voltage for each transistor provided by supply 16, and since the emitter of each transistor, and its collector when fully conductive, is maintained at a different level with respect to a common reference, a stepped output is produced. Capacitors 26*a*–26*d*, associated with each transistor collector electrode, are charged to the collector voltage of each transistor with respect to the reference or ground potential. As each transistor conducts, its collector electrode and hence the charge on its associated capacitor is made less negative with respect to the reference potential by the amount of the step voltage developd across load resistors 12*a*–12*d*. There is a momentary current flow from each capacitor through output impedance 27 to readjust the charge on capacitors 26*a*–26*d* to the new collector voltage level with respect to the reference potential. It is therefore readily apparent that as analog input 40 rises to a level 41*d*, each of the transistors 10*a*–10*d* are successively rendered conductive to provide step voltages 43*a*–43*d* and to provide pulses 45*a*–45*d* across the common output. Accordingly, there is provided one pulse for each predetermined increment increase in the analog input voltage so that the circuit provides a simple digitizer for analog voltages having a level which varies in time.

By proper selection of circuit parameters, it is possible to render individual transistor stages conductive when the analog input exceeds the emitter voltage of that stage by a small predetermined amount. Typically an input analog voltage in excess of 0.1 volt of a predetermined emitter voltage will render that transistor stage fully conductive. Therefore, each transistor stage may be made extremely sensitive to a predetermined voltage range to provide rapid switching operation when this voltage range has been exceeded. To further provide versatility of operation, input circuit impedance 22 may include a calibrated voltage divider so that input analog voltages can be normalized for a given biasing arrangement. Although the circuit of FIG. 1 is shown for use with P-N-P transistors and a negative going analog voltage, it should be obvious that the use of N-P-N transistors, with proper polarity biasing, will provide the same result for a positive going analog voltage.

As has been previously mentioned, the analog-to-digital converter of the present invention may be arranged to provide a binary code indicative of a voltage range into which the input analog signal falls. In considering two successive stages of a digitizer as represented by transistors 10*a* and 10*b* in FIG. 3, it is possible that both transistors will be non-conducting, that transistor 10*a* will be conducting and transistor 10*b* will be non-conducting, or that both transistors 10*a* and 10*b* will be conducting. In terms of binary logic, the 0 state of any stage may be represented by a non-conducting transistor and the 1 state represented by a conducting transistor. Thus, if X is considered the analog input of sufficient magnitude to just render transistor 10*a* conductive, and Y is considered the value of analog input to just render transistor 10*b* conductive, the following permutations are possible.

| Analog input: | Binary output |
|---|---|
| $<X$ | 00 |
| $>X, <Y$ | 10 |
| $>Y$ | 11 |

It can be seen that the permutation of 1, 0 is indicative of an analog input range of X–Y, as established by the emitter biasing voltage of two successive digitizer stages. The fourth possible permutation of 0, 1 is forbidden by this system since the digitizer characteristics are such that a second stage cannot produce an output without the first stage having also produced an output.

Figure 3:
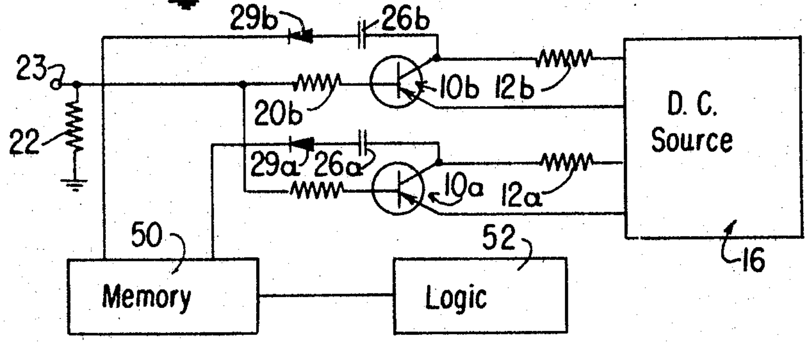
FIG. 3 is a circuit diagram showing the manner in which the circuit of FIG. 1 is used to produce a binary code representative of a predetermined range of input voltage levels.

As shown in FIG. 3, the output pulse developed by each stage of the digitizer may be coupled to a memory storage unit 50. This memory storage may conveniently include a plurality of binary flip-flops, one for each stage of the digitizer. As each stage is rendered conductive by an increase in analog input level, its associated flip-flop will be energized. When conditioned by the fact that each flip-flop cannot be energized until the preceding one has been energized by the digitizer, it is possible by binary counting techniques to determine which one of a plurality of stages represents the maximum excursion of the analog input. Therefore, any predetermined range within the limits of the emitter biasing voltage range of two successive digitizer stages may be determined and stored in memory unit 50. Additional analog signals representative of various types of desired information may be in turn supplied to input 23 of the digitizer to be subsequently stored in memory system 50. The result of a plurality of digitized outputs, each representative of a desired voltage range of test parameters of interest, then may be coupled to a decision logic system 52 to determine the overall acceptability of the information supplied by the digitizer.

It should be apparent from the above that any number of transistor stages may be employed in the digitizer and that any predetermined range to render successive stages in the digitizer conductive may be chosen. Further, it is not necessary that the difference in input level at which two successive stages conduct to be the same. By proper selection of circuit parameters, it is possible to cause individual transistor stages to become conductive when the analog input voltage is within 0.1 volt of a predetermined emitter bias voltage. Because the output pulses of the digitizer are self-generated, it is not necessary to use synchronized clock pulses and associated gating circuitry. Digital values are obtained by a simple comparison which does not require the use of a sensitive null detector. The analog-to-digital converter of the invention is simple and reliable in operation utilizing standard transistors and standard circuit components.

I claim:

1. A circuit for providing a digital output signal in response to an analog input signal, said circuit including, in combination:

means for supplying direct current voltage, said voltage supplying means having a plurality of points thereon with each of said points providing a different voltage with respect to a reference potential, a plurality of transistors, each having input and output and control electrodes, a first plurality of variable tap means connected between selected ones of said points and the common electrodes of said plurality of transistors, respectively, a second plurality of variable tap means connected between other selected ones of said points and the output electrodes of each said transistors respectively, said variable tap means being adjustable to establish the operating voltages for said plurality of transistors and to bias same to cutoff, with the cutoff bias for each transistor being different with respect to said reference potential, means connecting the control electrode of said transistors across a common input impedance, and means including capacitor means coupling the output electrodes of said transistors across a common output impedance, so that an analog signal applied across said input impedance causes successive ones of said transistors to conduct as said analog signal exceeds the threshold voltage between said input and control electrodes for each successive transistor by a predetermined amount, whereby a series of output pulses is developed across said output impedance in response to successive conduction of said transistors.

2. A circuit for providing a digital output signal in response to an analog input signal, said circuit including, in combination:

a plurality of transistors, each having collector, emitter and base electrodes, direct current voltage supply means having a plurality of points thereon which exist at different potentials with respect to a reference potential, a first plurality of variable tap means connected respectively between the emitter electrodes of said plurality of transistors and a plurality of selected points on said voltage supply means, a second plurality of variable tap means connecting the collector electrodes of said transistors respectively to other selected points on said voltage supply means, with the operating voltages of each transistor being established by varying the positions of said variable tap means, said variable tap means being adjustable to provide operating voltage for said transistors and to bias each of said transistors to cutoff, with the cutoff bias voltage for each transistor having a different value with respect to said reference potential, means connecting the base electrodes of said transistors to a common input terminal, impedance means connecting said input terminal to said reference potential, capacitor means coupling the collector electrode of each transistor to a common output terminal, and output impedance means connecting the output terminal to said reference potential, so that an analog signal applied across said input impedance causes successive ones of said transistors to conduct as said signal exceeds the operative voltages of each successive transistor by a predetermined amount, whereby an output pulse is produced across said output impedance in response to the conduction of each said transistor.

3. A circuit for producing a digital output signal in response to an analog input signal, said circuit including, in combination:

a plurality of direct current transistor amplifier stages, direct current voltage supply means for providing a plurality of distinct biasing voltages at a plurality of points thereon, with each biasing voltage having a different value with respect to a common reference potential, a first plurality of variable tap means connecting each of the emitters of said transistor amplifier stages to a first plurality of selected points on said direct current voltage supply means and a second plurality of variable tap means connecting the collector electrodes of said transistor amplifier stages to a second plurality of selected points on said voltage supply means, said variable tap means being adjustable to provide operating voltages for said transistor amplifier stages to bias said transistor amplifier stages to cutoff, with the level of bias voltage for individual transistor stages set at different levels with respect to said reference potential, the voltage increment between bias voltages for two successive stages being a predetermined amount, means connecting the input of each stage to a common input terminal so that an analog input signal exceeding the bias voltage on the emitters of individual transistor stages by a predetermined amount causes said stages to conduct successively, and means coupled to said stages to provide an output pulse in response to the conduction of successive individual stages, whereby the number of pulses is indicative of the number of voltage increments exceeded by the level of the analog input signal.

4. A circuit for providing a digital output signal in response to an analog input signal, said circuit including, in combination:

a plurality of transistors having collector, emitter, and base electrodes, direct current voltage supply means having a plurality of points thereon existing at different operating voltages, with each said operating voltage having a different value with respect to a reference potential, a first plurality of variable tap means connecting individual ones of the emitters of said transistors respectively to a first plurality of selected points on said direct current voltage supply means, and a second plurality of variable tap means connecting the collector electrodes of said plurality of transistors respectively to a second plurality of selected points on said direct current voltage supply means, said variable tap means being adjustable to establish the operating voltages for said transistors and to bias said transistors to cutoff, with the levels of bias voltage for individual transistors set at different values with respect to said reference potential and the voltage increment between biasing voltages for successive transistors being a predetermined amount, means connecting the base electrode of each transistor to a common input terminal, means for coupling an analog input signal to said common input terminal, with said individual transistors being biased to conduction when said analog signal exceeds the cutoff bias voltage for each transistor by a predetermined amount and impedance means coupled to said transistors for providing an output pulse in response to the conduction of each individual transistor, whereby the output pulse produces a digital representation of the predetermined voltage increment necessary to bias two successive transistors to conduction.

5. A digitizing circuit including, in combination:

a plurality of transistors having input, output and common electrodes, a single resistive voltage divider means for supplying direct current operating voltages, said voltage divider means having a plurality of points thereon existing at a different voltage level with respect to a common reference potential, a first plurality of variable tap means interconnecting the common electrodes of each transistor and a first plurality of selected points respectively on said voltage divider means, and a second plurality of variable tap means connected to a second plurality of selected points on said voltage divider means, said variable tap means being adjustable to connect different biasing potentials to transistors for biasing same to cutoff, individual resistance means connecting the output electrodes of each transistor to said second pluralities of variable tap means, respectively, and individual capacitor means coupling the output electrodes of each transistor to a common output impedance, means for connecting the input electrode of each said transistor to a common input impedance, so that an analog signal applied across said common input impedance and exceeding the bias voltages of individual ones of said transistors by a predetermined amount causes the transistors to conduct in succession and produce a voltage drop across the said individual resistance means, said voltage drop being coupled through said capacitor means to produce a voltage pulse across said output impedance, with the number of pulses developed across said output impedance being indicative of the level of the applied analog signal.

6. A digitizing circuit including, in combination:

a plurality of transistors each having emitter, collector and base electrodes, means for supplying a direct current voltage, said voltage supplying means having a plurality of points thereon, each existing at different voltage levels with respect to a common reference potential, a plurality of adjustable tap means individually connecting, respectively, the emitter and collector electrodes of each of said transistors to selected points on said voltage supplying means, so that each transistor may be biased to cutoff by adjusting said variable tap means, with the bias voltage for each said transistor having a different value with respect to said reference potential, individual resistance means connecting the collector electrodes of each of said transistors, respectively, via said variable tap means to different adjustable settings on said voltage supplying means to provide collector-to-emitter operating voltages for each transistor, individual capacitor means coupling the collector electrodes of each of said transistors, respectively, to an output impedance, and means connecting the base electrode of each said transistor to a common input impedance, so that an analog signal applied to said common input impedance which exceeds the base-emitter offset voltages of individual ones of said transistors by a predetermined amount causes said transistors to successively conduct and produce voltage drops across individual resistance means to thereby provide current pulses coupled through said capacitor means to said output impedance, with the number of said pulses being indicative of the level of said applied signal.

7. A quantizing circuit including, in combination:

a plurality of transistors having input, output and common electrodes, direct current voltage supply means having a plurality of connection points thereon which exist at different levels of voltage with respect to a reference potential, a first plurality of adjustable tap means connecting the common electrode of each transistor to selected points on said voltage supply means so that each transistor is biased to cutoff, with the bias voltage for each said transistor having a different value with respect to said reference potential, individual resistance means connected to the output electrode of each said transistor, and a second plurality of adjustable tap means connecting each of said individual resistance means respectively to other selected points on said voltage supply means to provide an operating voltage for each transistor, means for connecting the input electrode of each transistor to a common input impedance so that when a signal as applied across said input impedance and exceeds the bias voltages on individual ones of said transistors by a predetermined amount, said transistors are successively biased to conduction to thereby produce voltage drops across said resistance means, and individual capacitance means coupling the output electrodes of said transistors through a plurality of diodes respectively to a single output impedance means to thereby couple current pulses to said single output impedance means, with the number of pulses being indicative of an analog voltage applied across said input impedance.

8. A quantizing circuit including, in combination:

a plurality of transistors each having base, collector and emitter electrodes, D.C. voltage supply means having a plurality of terminals thereon existing at different voltages with respect to a reference potential, a first plurality of adjustable tap means connecting the emitter electrodes of said transistors respectively to selected terminals on said voltage supply means so that each said transistor is biased to cutoff, with the bias voltage for each transistor having a different value with respect to said reference potential, individual resistance means connected to the collector electrodes of said transistors, respectively, and a second plurality of adjustable tap means connecting said resistance means to other selected terminals on said voltage supply means, respectively, to provide collector-to-emitter operating voltages for said transistors, means for D.C. coupling the base electrodes of each of said transistors to a common input impedance so that when the level of a signal applied across said common input impedance exceeds the bias voltage of individual ones of said transistors by a given amount, said transistors are successively biased into conduction upon receipt of successively higher bias voltages to thereby produce voltage drops across said individual resistance means, and capacitor means coupling the collector electrodes of said transistors to output impedance means to provide a voltage pulse indicative of conduction in each transistor, whereby the number of pulses produced across said output impedance means is indicative of a voltage range of said signal applied across said common input impedance.

9. The circuit defined in claim 8 wherein said D.C. voltage supply means comprises a single resistance connected between a voltage supply input terminal and a point of reference potential, said first and second pluralities of adjustable tap means being electrically connectable to a plurality of points on said resistor so that a single D.C. voltage supply is operative to provide individual operating voltages for said plurality of transistors.

References Cited

UNITED STATES PATENTS

| | | | |
|---|---|---|---|
| 2,413,440 | 12/1946 | Farrington | 250—27 |
| 2,869,079 | 1/1959 | Staffin et al. | 332—11 |

MAYNARD R. WILBUR, Primary Examiner

C. D. MILLER, Assistant Examiner

U.S. Cl. X.R.

179—15; 307—227; 328—14, 150; 340—172, 347